(12) United States Patent
Cheng et al.

(10) Patent No.: US 10,444,393 B2
(45) Date of Patent: Oct. 15, 2019

(54) COHERENT NOISE ATTENUATION USING STATISTICAL METHODS

(71) Applicant: Halliburton Energy Services, Inc., Houston, TX (US)

(72) Inventors: Dongjie Cheng, Katy, TX (US); Laura Torres Laza, Houston, TX (US); Xiaomin Zhao, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 216 days.

(21) Appl. No.: 15/301,629

(22) PCT Filed: Mar. 27, 2015

(86) PCT No.: PCT/US2015/023127
§ 371 (c)(1),
(2) Date: Oct. 3, 2016

(87) PCT Pub. No.: WO2016/159939
PCT Pub. Date: Oct. 6, 2016

(65) Prior Publication Data
US 2017/0031047 A1    Feb. 2, 2017

(51) Int. Cl.
*G01V 1/48* (2006.01)
*G01V 1/32* (2006.01)
*G01V 1/36* (2006.01)

(52) U.S. Cl.
CPC ............... *G01V 1/48* (2013.01); *G01V 1/325* (2013.01); *G01V 1/364* (2013.01); *G01V 2210/121* (2013.01); *G01V 2210/1295* (2013.01); *G01V 2210/1425* (2013.01); *G01V 2210/1429* (2013.01); *G01V 2210/3246* (2013.01); *G01V 2210/47* (2013.01)

(58) Field of Classification Search
CPC ........................................................ G01V 1/48
USPC .............................................................. 702/6
See application file for complete search history.

(56) References Cited

U.S. PATENT DOCUMENTS

| 5,060,202 A | 10/1991 | Meek et al. |
| 5,448,531 A | 9/1995 | Dragoset, Jr. |
| 6,738,715 B2 | 5/2004 | Shatilo et al. |

(Continued)

OTHER PUBLICATIONS

International Preliminary Report on Patentability issued in related PCT Application No. PCT/US2015/023127 dated Oct. 12, 2017. 17 pages.

(Continued)

*Primary Examiner* — Ricky Ngon
(74) *Attorney, Agent, or Firm* — Benjamin Fite; Baker Botts L.L.P.

(57) ABSTRACT

A system for attenuating coherent noise from seismic data comprises one or more sensors configured to sense waves generated by a seismic source and a coherent noise attenuation module communicably coupled to the one or more sensors and comprising a processor and memory. The coherent noise attenuation module is operable to receive a plurality of traces of seismic data from the one or more sensors and apply a first transformation to the plurality of traces, identify one or more outlier waveforms in the transformed traces, attenuate the identified outlier waveforms, and apply a second transformation to the plurality of traces that is the inverse of the first transformation.

20 Claims, 8 Drawing Sheets

(56) References Cited

U.S. PATENT DOCUMENTS

| | | | |
|---|---|---|---|
| 2003/0055569 A1* | 3/2003 | Shatilo | G01V 1/28 702/17 |
| 2005/0180262 A1* | 8/2005 | Robinson | G01V 1/364 367/47 |
| 2007/0076525 A1 | 4/2007 | Craft et al. | |
| 2008/0221801 A1* | 9/2008 | Craft | G01V 1/364 702/17 |
| 2009/0006516 A1* | 1/2009 | Ha | G01S 7/021 708/404 |
| 2009/0180351 A1* | 7/2009 | Paffenholz | G01V 1/364 367/38 |
| 2009/0262602 A1 | 10/2009 | Robinson | |
| 2014/0219054 A1* | 8/2014 | Mousa | G01V 1/364 367/43 |
| 2014/0316709 A1 | 10/2014 | Ji et al. | |
| 2015/0355357 A1* | 12/2015 | Wang | G01V 1/364 702/17 |
| 2016/0187513 A1* | 6/2016 | Poole | G01V 1/362 702/16 |
| 2016/0223698 A1* | 8/2016 | Wang | G01V 1/364 |
| 2016/0320508 A1* | 11/2016 | Peng | G01V 1/36 |
| 2016/0327670 A1* | 11/2016 | Wang | G01V 1/325 |

OTHER PUBLICATIONS

International Search Report and Written Opinion issued in related PCT Application No. PCT/US2015/023127, dated Nov. 12, 2015, 20 pages.

\* cited by examiner

COHERENT NOISE ATTENUATION USING STATISTICAL METHODS

CROSS-REFERENCE TO RELATED APPLICATION

The present application is a U.S. National Stage Application of International Application No. PCT/US2015/023127 filed Mar. 27, 2015, which is incorporated herein by reference in its entirety for all purposes.

BACKGROUND

This disclosure generally relates to monitoring of geological formations. In particular, this disclosure relates to reducing coherent noise in seismic data using statistical techniques.

Seismic data may aid in determining one or more characteristics of a formation. The collection of seismic data involves generating waves in the formation using a seismic source, and sensing those waves and their reflections using sensors at one or more locations in the formation. Sources of seismic energy may include vibrators configured to generate seismic waves in the ground or air guns configured to generate seismic waves in water above offshore formations. The seismic waves may be detected using sensors such as geophones or fiber optic cable (e.g., in distributed acoustic sensing (DAS) systems). The sensors may be located along the surface of the formation (or surface of water above an offshore formation) or inside the formation (e.g., inside a hydrocarbon wellbore).

BRIEF DESCRIPTION OF THE DRAWINGS

These drawings illustrate certain aspects of certain embodiments of the present disclosure. They should not be used to limit or define the disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure describes methods for attenuating or removing coherent noise present in seismic data using statistical techniques. Coherent noise may be a major concern for seismic data processing. Coherent noise may refer to non-random noise which may be typically high amplitude signals having a particular slope. Example coherent noise events in seismic data may include ground rolls, refractions, multiples, and tube waves in vertical seismic profile (VSP) data. These kinds of waves may have stronger energy than the desired signals in the seismic data and may therefore overshadow or overwhelm the desired signals.

Current methods for attenuating these coherent noise events may present issues in certain situations. For example, dip filters may be used to attenuate coherent noise in seismic data by using the differences in moveout between the desired signals and the coherent noise, such as through the use of a F-K filter, median filter, and/or tau-p filter. Such filters may be designed to weight information in the data depending on its dip rather than its frequency content. Because these filters remove signals based on their dip or moveout, however, they may present issues when the noise event has a similar moveout as the desired data (i.e., the desired data may be attenuated if it has a similar moveout as the coherent noise that is being attenuated by the filter). Another method of attenuating noise in seismic data includes the use of adaptive filters. However, these filters require a pure record of the noise event (i.e., a record of the noise event alone, without the desired signal), which may not be available in all situations.

Accordingly, aspects of the present disclosure may provide robust methods for removing or attenuating coherent noise in seismic data with little to no effect on desired signals. In particular, embodiments of the present disclosure may first identify and isolate coherent noise in seismic data. This may be done so that desired signal in the seismic data are not attenuated or removed along with the identified coherent noise. The coherent noise may be identified in the seismic data according to knowledge of the geophysical properties of the formation. Once isolated from the seismic data, the traces of the coherent noise signal may be transformed (e.g., shifted in time) such that the coherent noise becomes random or semi-random. The transformed traces may then be analyzed at particular times to determine statistical outliers in the traces at each particular time. For example, signals with statistically outlying amplitudes (e.g., very high amplitude signals) may be identified based on a percentile threshold (e.g., removing signals having amplitudes greater than the 90th percentile of amplitudes at the particular time) or based on a standard deviation threshold (e.g., removing signals having amplitudes greater than three standard deviations from the mean amplitude at the particular time). The identified outlier signals at each particular time may then be removed or attenuated. After the outliers have been removed from the transformed traces, the transformation in the traces may then be undone. The traces with the attenuated noise signals may then be merged back into the seismic data signals, providing a less noisy seismic data signal for analysis.

To facilitate a better understanding of the present disclosure, the following examples of certain embodiments are given. In no way should the following examples be read to limit, or define, the scope of the disclosure. Embodiments of the present disclosure and its advantages are best understood by referring to FIGS. 1 through 5, where like numbers are used to indicate like and corresponding parts.

Embodiments of the present disclosure may be applicable to horizontal, vertical, deviated, multilateral, u-tube connection, intersection, bypass (drill around a mid-depth stuck fish and back into the wellbore below), or otherwise nonlinear wellbores in any type of subterranean formation. Certain embodiments may be applicable, for example, to logging data acquired with wireline, slickline, and logging while drilling/measurement while drilling (LWD/MWD). Certain embodiments may be applicable to subsea and/or deep sea wellbores. Embodiments described below with respect to one implementation are not intended to be limiting.

Figure 1:
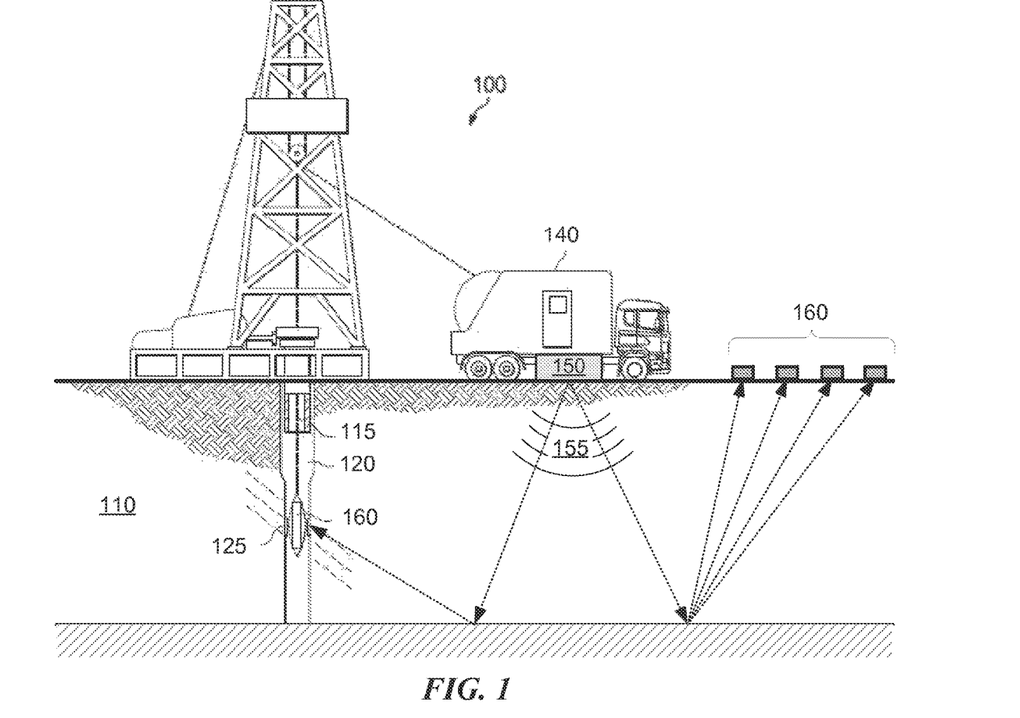
FIG. 1 illustrates an example seismic data collection system, in accordance with embodiments of the present disclosure.

FIG. 1 illustrates an example seismic data collection system 100, in accordance with embodiments of the present disclosure. System 100 includes a vibration source 150 coupled to logging facility 140 (shown in FIG. 1 as a truck, although it may be any other structure, such as a boat in offshore embodiments). Vibration source 150 may be configured to generate seismic waves 155, which may propagate and/or reflect in formation 110 until they are received at sensors 160. Vibration source 150 may include one or more vibrators coupled to the surface of formation 110, in certain land-based embodiments. Vibration source 150 may also include air guns configured to generate waves through water toward formation 110, in certain offshore embodiments.

Sensors 160 may include any suitable sensor for detecting seismic waves 155 in formation 110. For example, sensors 160 may include geophones, in certain embodiments. The geophones may be placed in any suitable location along the surface of a formation for collecting seismic data associated with the formation. Although illustrated as a single source-multiple sensor configuration in FIG. 1, embodiments of the present disclosure may utilize a multiple source-single sensor configuration or a multiple source-multiple sensor configuration. Furthermore, although not shown, as another example, sensors 160 may include fiber optic cable operable to sense seismic waves 155 using distributed acoustic sensing (DAS) techniques, in certain embodiments. In embodiments using DAS techniques to collect seismic data, the fiber optic cable may be cemented into the wellbore wall behind tubing or casing, or be temporarily placed in the well (e.g., inside a retrievable wireline logging cable) with the drill string in place or removed from the wellbore.

Figure 2:
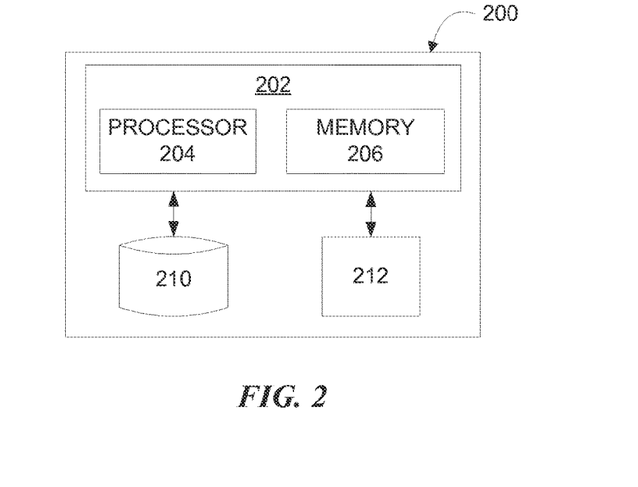
FIG. 2 illustrates an example computing system, in accordance with embodiments of the present disclosure.

Sensors 160 may be located in any suitable location for detecting seismic waves 155 in formation 110. For example, sensors 160 may be located along the surface of formation 110 as shown in FIG. 1. As another example, sensors 160 may be located in logging tool 125 suspended into wellbore 120 by conveyance 115 (e.g., a cable, slickline, coiled tubing, or the like). Although not shown, as yet another example, sensors 160 may be located in a logging tool coupled to a drill string for use in seismic LWD/MWD. Conveyance 115 may contain conductors for transporting power or telemetry from logging tool 125 to logging facility 140. Alternatively, conveyance 115 may lack a conductor, as is often the case using slickline, coiled tubing, or drill pipe, and logging tool 125 may contain a control unit that contains memory, one or more batteries, and/or one or more processors for performing operations and storing measurements.

Logging facility 140 may collect measurements from sensors 160 (e.g., seismic data), and may include one or more computing systems for processing or storing the measurements gathered. In embodiments where sensors 160 are located on the surface of formation 110, the computing systems may be communicatively coupled to sensors through any suitable means, including wired and wireless connections. In embodiments where sensors 160 are located inside wellbore 120, the computing systems may be communicatively coupled to sensors 160 by way of conveyance 115. An example computing system is described with more detail with reference to FIG. 2.

FIG. 2 illustrates an example computing system 200, in accordance with embodiments of the present disclosure.

Computing system 200 may be configured to receive seismic data and perform one or more coherent noise reduction methods in accordance with the teachings of the present disclosure. For example, computing system 200 may be used to perform the steps of methods as described below with respect to FIGS. 3-5. In particular embodiments, computing system 200 may include coherent noise attenuation module 202. Computing system 200 or components thereof can be located at the surface (e.g., in logging facility 140), downhole (e.g., in or proximate to logging tool 125), or some combination of both locations (e.g., certain components could be disposed at the surface and certain components could be disposed downhole, where the surface components are communicatively coupled to the downhole components).

Coherent noise attenuation module 202 may include any suitable components. For example, in some embodiments, coherent noise attenuation module 202 may include processor 204. Processor 204 may include, for example a microprocessor, microcontroller, digital signal processor (DSP), application specific integrated circuit (ASIC), or any other digital or analog circuitry configured to interpret and/or execute program instructions and/or process data. In some embodiments, processor 204 may be communicatively coupled to memory 206. Processor 204 may be configured to interpret and/or execute program instructions or data retrieved and stored in memory 206. Program instructions or data may constitute portions of software 210 for carrying out methods of coherent noise reduction, as described herein. Memory 206 may include any system, device, or apparatus configured to hold and/or house one or more memory modules; for example, memory 206 may include read-only memory, random access memory, solid state memory, or disk-based memory. Each memory module may include any system, device or apparatus configured to retain program instructions and/or data for a period of time (e.g., computer-readable non-transitory media). For example, instructions from software 210 may be retrieved and stored in memory 206 for execution by processor 204.

Coherent noise attenuation module 202 may be communicatively coupled to one or more displays 212 such that information processed by coherent noise attenuation module 202 (e.g., seismic data) may be conveyed to operators of drilling and logging equipment.

Modifications, additions, or omissions may be made to FIG. 2 without departing from the scope of the present disclosure. For example, FIG. 2 shows a particular configuration of components of computing system 200. However, any suitable configurations of components may be used. For example, components of computing system 200 may be implemented either as physical or logical components. Furthermore, in some embodiments, functionality associated with components of computing system 200 may be implemented in special purpose circuits or components. In other embodiments, functionality associated with components of computing system 200 may be implemented in configurable general purpose circuit or components. For example, components of computing system 200 may be implemented by configured computer program instructions.

Figure 3A:
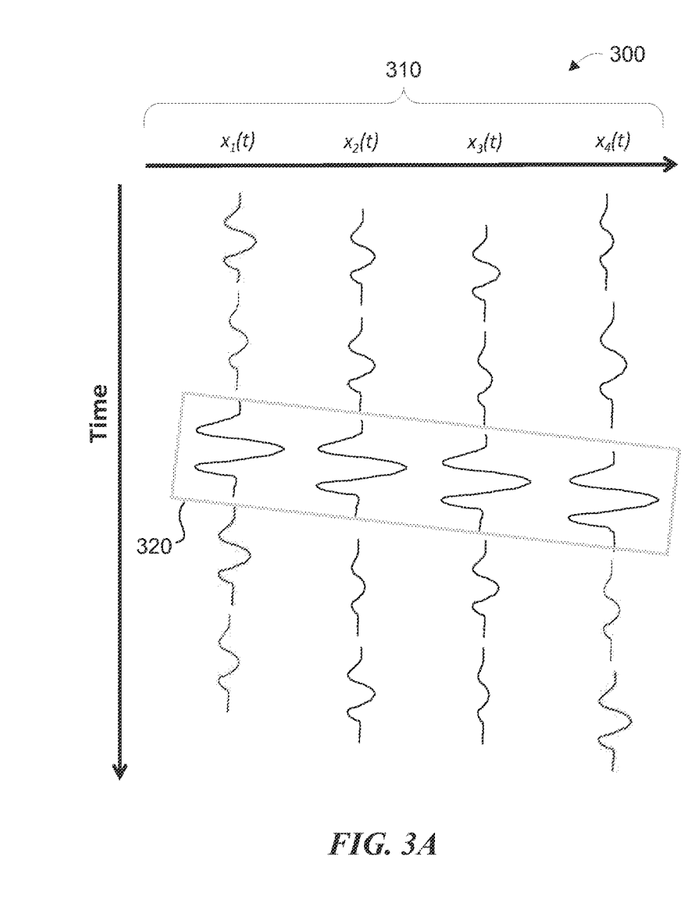
FIGS. 3A-3G illustrate an example method for attenuating coherent noise in traces of seismic data, in accordance with embodiments of the present disclosure.

FIGS. 3A-3G illustrate an example method for attenuating coherent noise 320 in traces 310 of seismic data 300, in accordance with embodiments of the present disclosure. Seismic data 300 may comprise a plurality of traces 310, which may each be associated with a particular area in the formation that is being analyzed. For example, in VSP data, each trace may be associated with a particular depth in the formation. FIG. 3A illustrates traces 310 of seismic data 300 without any manipulation (i.e., as it is received from the sensors of the system). Traces 310 comprise coherent noise event 320, which may be assumed for purposes of illustration to have been already identified. In order to attenuate coherent noise event 320 from traces 310, embodiments of the present disclosure may first shift traces 310. This may be done, for example, in order to make coherent noise event 320 appear more random in seismic data 300 such that statistical analyses may be more easily performed on the data.

Figure 3B:
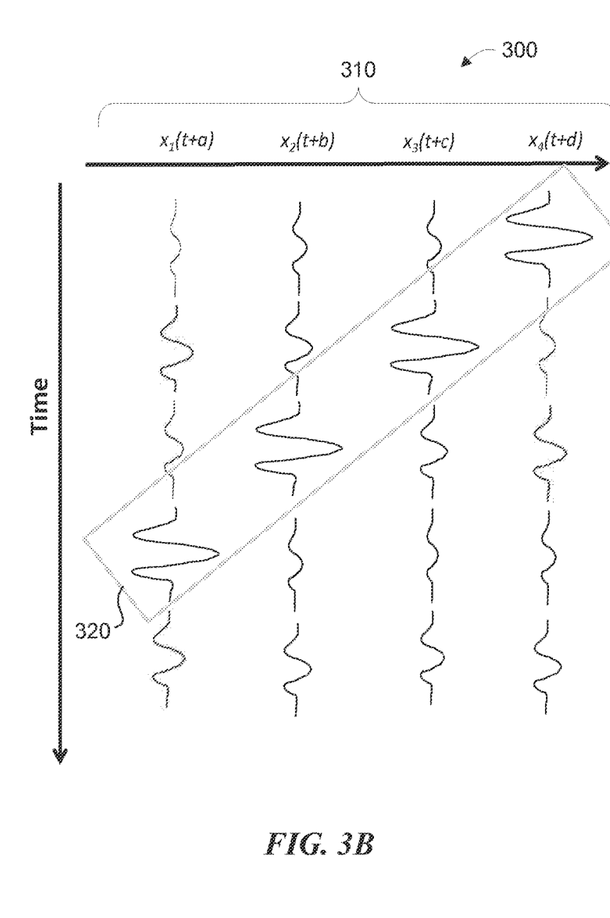

As shown in FIG. 3B, traces 310 may be shifted by times a, b, c, and d, respectively, which may each be unique values with respect to one another (that is, none of a, b, c, or d are equal). Traces 310 may be shifted according to one or more rules in particular embodiments. For example, traces 310 may each be shifted by an increasing multiple of a first break time, $t_0$. As an example, referring to FIG. 3B, this may mean that $d=t_0$, $c=2*t_0$, $b=3*t_0$, and $a=4*t_0$. As another example, referring to FIG. 3B, this may mean that $d=t_0$, $c=10*t_0$, $b=20*t_0$, and $a=30*t_0$. Although illustrated as time shift, it will be understood that other methods of transforming the traces of seismic data may be used, such as the use of a tau-p transform.

In particular embodiments, the amount of trace shifting may be determined by an iterative estimation process. For example, in time shifting embodiments, a first shifting rule may be used for shifting traces 310. It may then be determined whether traces 310 shifted according to the first shifting rule may be analyzed using aspects of the present disclosure. This may include, in certain embodiments, determining whether waveforms of coherent noise event 320 have become sufficiently random with respect to time such that the waveforms may be identified according to the present disclosure as outliers and thus attenuated.

Figure 3C:
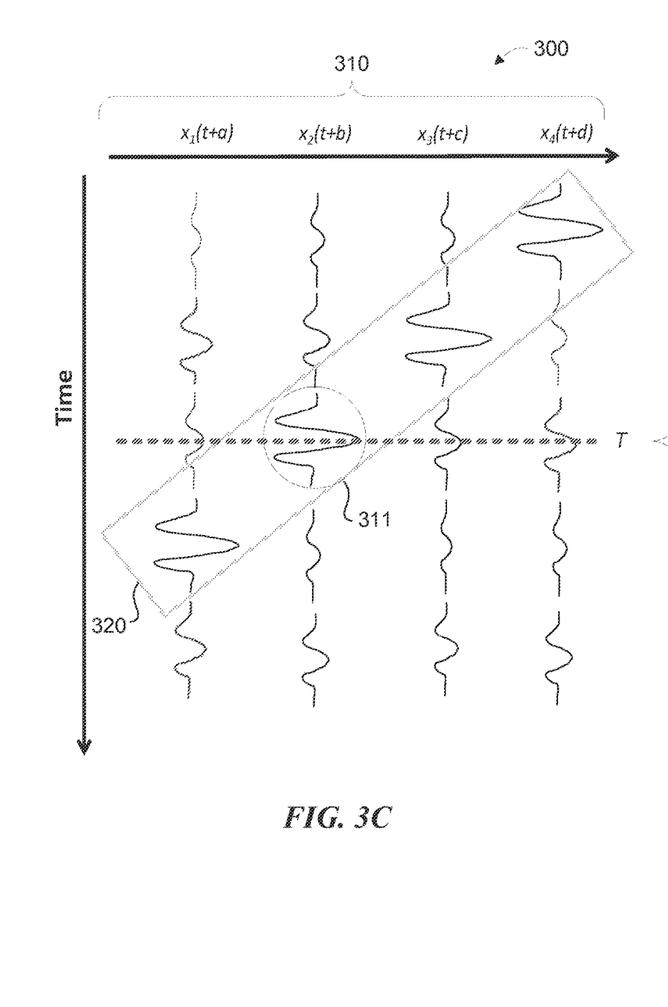
Figure 3D:
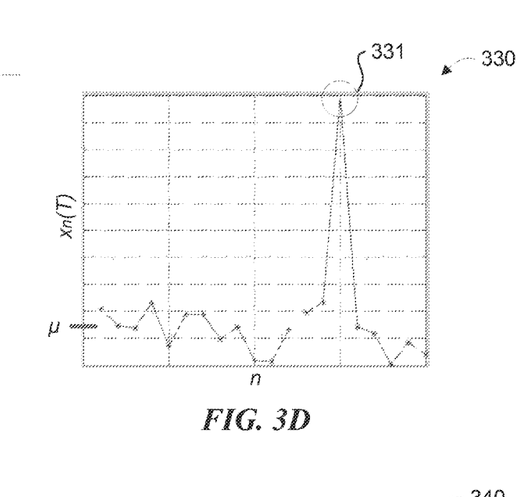
Figure 3E:
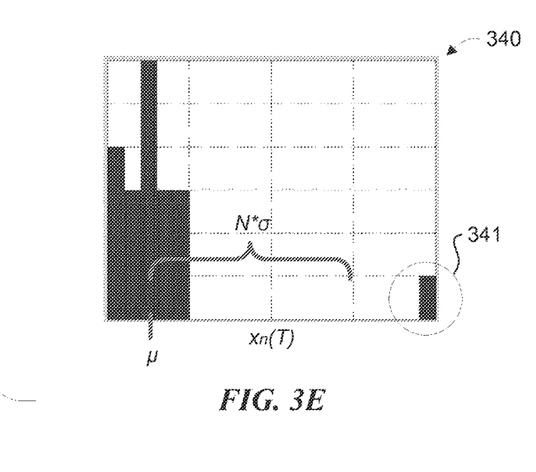

Once traces 310 have been shifted, traces 310 may then be analyzed at various points in time (or windows of time) to determine statistical outliers (e.g., waveforms at a particular time that have statistically outlying amplitude with respect to other waveforms at the particular time). FIGS. 3C-3E illustrate an example statistical analysis of shifted traces 310 performed at time T. Waveform 311 at time T in FIG. 3C constitutes a portion of coherent noise event 320. Although illustrated as an analysis at a particular time T, the same analysis may be performed using windows of time in addition to or in lieu of analyzing seismic data 300 at particular points in time. FIG. 3D illustrates an example chart 330 of the various amplitudes at time T, and FIG. 3E illustrates an example histogram 340 of the amplitudes illustrated in FIG. 3D. Waveform 311 appears in FIG. 3D having amplitude 331. Using any suitable statistical techniques, it may be determined that waveform 311 having amplitude 331 is a statistical outlier at time T (shown in FIG. 3E as outlying data point 341). For example, it may be determined that data point 341 is an outlier using a threshold based on whether the data point lies outside a range from the mean of the amplitudes at time T. The threshold may be, for example, a multiple of standard deviations (e.g., three standard deviations from the mean, as shown in FIG. 3E). As another example, it may be determined that data point 341 is an outlier using a threshold based on whether the data point lies beyond a percentile of the amplitudes at time T. The percentile threshold for determining outliers may be, for example, 85th percentile, 90th percentile, 95th percentile, or 99th percentile.

Figure 3F:
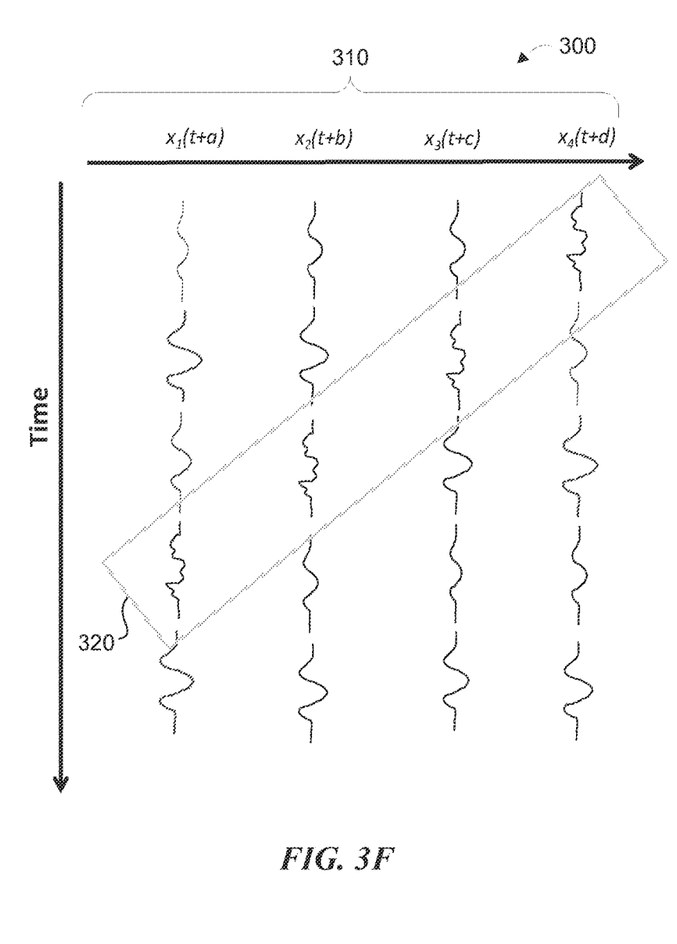
Figure 3G:
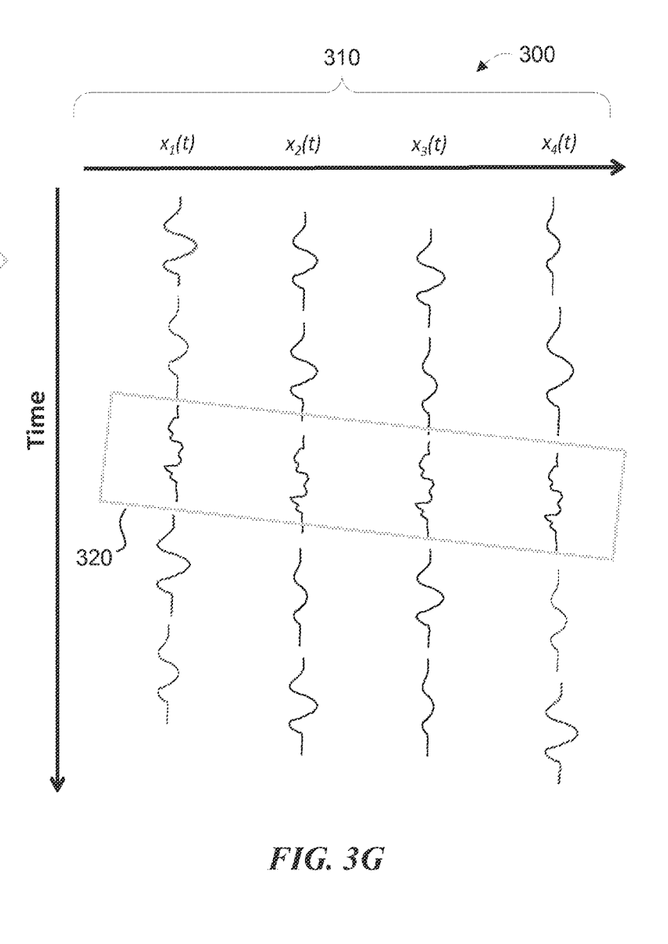

Once outlier waveforms have been determined, the outlier waveforms may then be attenuated. FIG. 3F illustrates traces 310 having attenuated outlier waveforms (i.e., those within coherent noise event 320). The attenuated outlier waveforms may be attenuated using any suitable method, including attenuation through multiplying the waveform by a particular coefficient less than one. Attenuation of the outlier waveforms may include, in some embodiments, removal from the data set (i.e., multiplied by a zero coefficient). Furthermore, attenuation of the outlier waveforms may include removal and replacement of the waveforms with an interpolated signal that is determined based on adjacent trace data. After the outliers have been attenuated, the shifted traces 310 may then be shifted back to their original time (i.e., the initial shift may be undone), returning them to their original state but with attenuated coherent noise event 320 as shown in FIG. 3G.

Modifications, additions, or omissions may be made to FIGS. 3A-3G without departing from the scope of the present disclosure. For example, although illustrated as shifting the entire set of seismic data 300, a portion of seismic data 300 containing coherent noise event 320 may be isolated (or "cut out") from the data set prior to performing the shifting and attenuation methods described above. In such embodiments, the isolated data may be merged back into the full seismic data set after the time shift has been undone. As another example, although illustrated and described as performing statistical outlier analysis at particular times or in particular time windows, each trace may be separately analyzed for statistical outliers (with the outliers being attenuated) prior to performing the steps described above. Furthermore, although illustrated as attenuating coherent noise in seismic data, methods according to the present disclosure may be used to attenuate coherent noise in other types of data, such as digital imaging data.

Figure 4A:
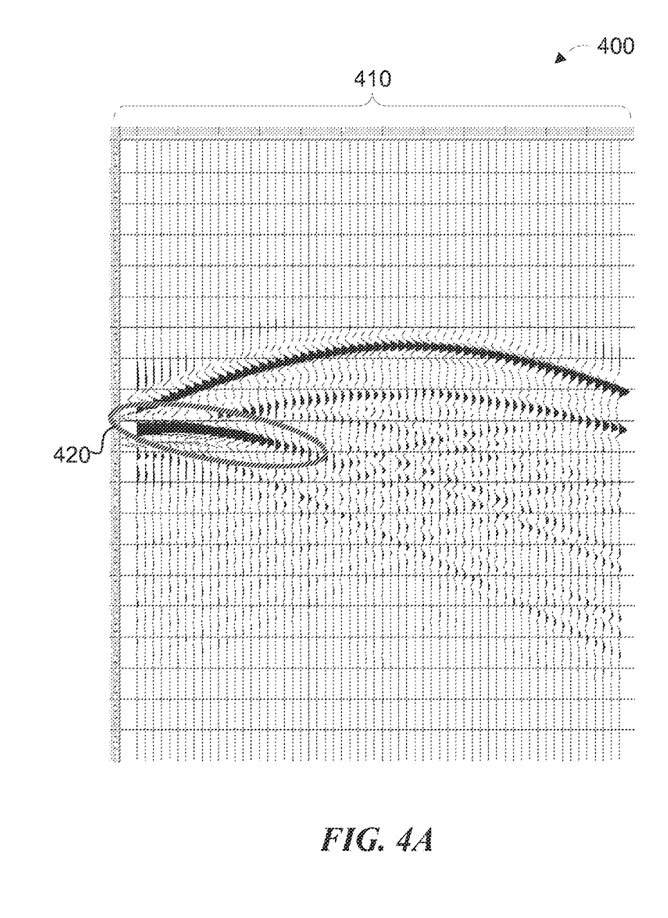
FIGS. 4A-4E illustrate another example method for attenuating coherent noise in traces of seismic data, in accordance with embodiments of the present disclosure.

FIGS. 4A-4E illustrate another example method for attenuating coherent noise 420 in traces 410 of seismic data 400, in accordance with embodiments of the present disclosure. Similar to seismic data 300 of FIGS. 3A-3G, seismic data 400 may comprise a plurality of traces 410, which may each be associated with a particular area in the formation that is being analyzed. FIG. 4A illustrates traces 410 of seismic data 400 without any manipulation (i.e., as it is received from the sensors of the system). Traces 410 comprise coherent noise event 420, which may be assumed for purposes of illustration to have been already identified as coherent noise as opposed to other events in seismic data 400.

Figure 4B:
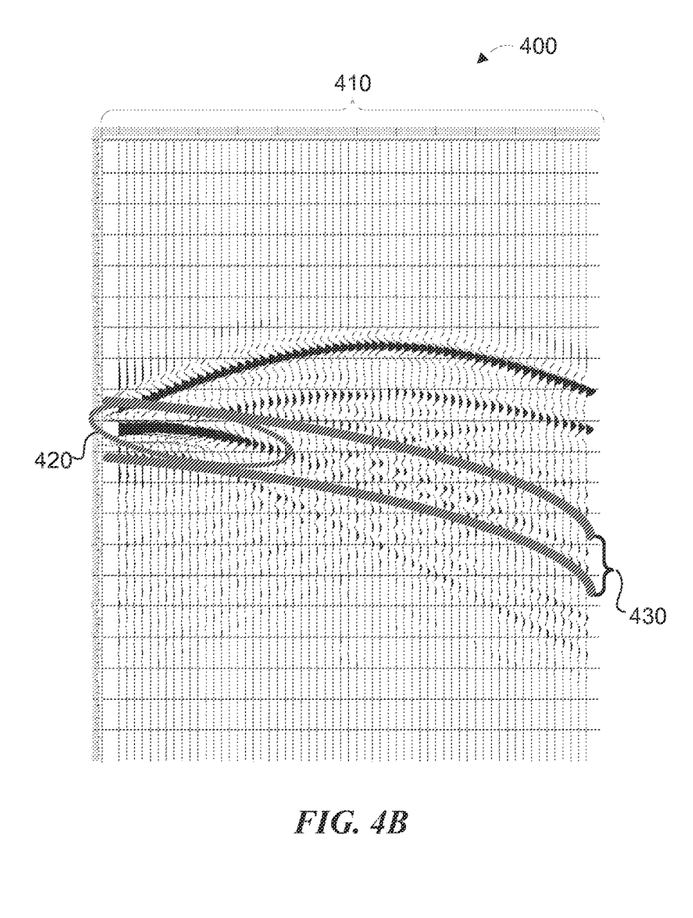
Figure 4C:
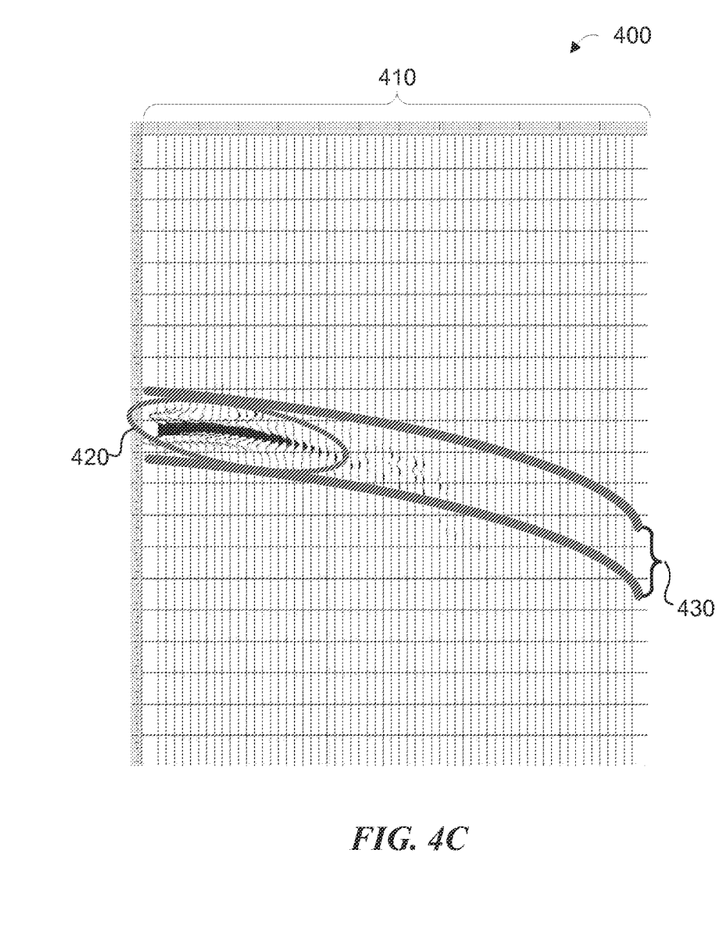

Once identified as coherent noise, coherent noise event 420 may be isolated from seismic data 400 prior to performing the coherent noise attenuation steps in accordance with the present disclosure. This may be done by isolating a portion of traces 410 of seismic data 400 that contains coherent noise event 420. For example, as shown in FIG. 4B, window 430 may be used to isolate the portion of traces 410 containing coherent noise event 420. Window 430 may be based on a particular window of time in some embodiments. In certain embodiments (and as shown in FIG. 4B), window 430 may be based on the moveout of coherent noise event 420. The moveout of coherent noise event 420 may refer to the velocity or velocities of coherent noise event 420 (i.e., the slope of coherent noise event in seismic data 400). FIG. 4C illustrates an example isolated portion of seismic data 400 based on window 430.

Figure 4D:
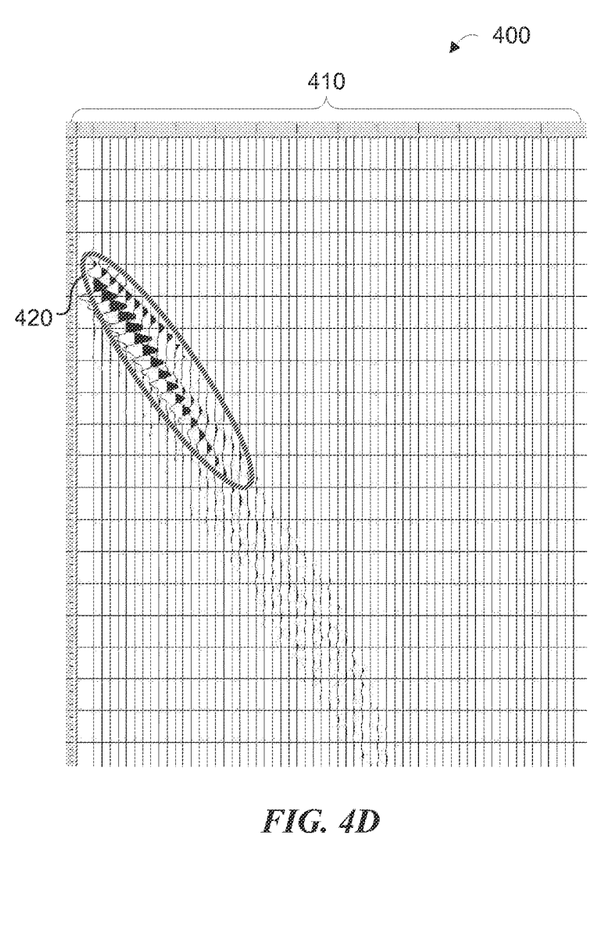

After being isolated as described above, the portion of seismic data 400 containing coherent noise event 420 may then be shifted for noise analysis and attenuation. Thus, referring to FIG. 4C, each of traces 410 that remain in the portion of seismic data 400 isolated using window 430 may be shifted according to one or more rules. Although illustrated as time shift in FIG. 4C, other methods of transforming the traces 410 of seismic data 400 may be used, such as the tau-p transform. Traces 410 may each be shifted by particular times, in certain embodiments, which may each be different from one another. For example, traces 410 may each be shifted by an increasing multiple of a first break time as described above. FIG. 4D illustrates an example version of isolated traces 410 of FIG. 4C shifted according to one or more rules.

In particular embodiments, the amount of trace shifting may be determined by an iterative estimation process. For example, a first shifting rule may be used for shifting traces 410, and then it may be determined whether traces 410 shifted according to the first shifting rule may be analyzed using aspects of the present disclosure. This may include determining whether waveforms of coherent noise event 420 have become sufficiently random with respect to time such that the waveforms may be identified according to the present disclosure as outliers and thus attenuated.

Once the isolated traces 410 have been shifted, they may be analyzed at various times (or windows of time) to determine statistical outliers (e.g., waveforms in a particular time window that have statistically outlying amplitude with respect to other waveforms in the particular time window). The statistical methods used to identify outlying waveforms may be any suitable statistical method for determining outliers, and may be similar to those illustrated and discussed above with respect to FIGS. 3C-3E. For example, outlying waveforms may be identified using a threshold based on the mean and standard deviation of the amplitudes of waveforms during the particular time window (e.g., amplitudes greater than three standard deviations from the mean are determined to be outliers). As another example, outlying waveforms may be identified using a threshold based on percentiles of the amplitudes of waveforms during the particular time window (e.g., amplitudes greater than the 95th percentile or 99th percentile of amplitudes during the particular time window may be considered to be outliers).

Figure 4E:
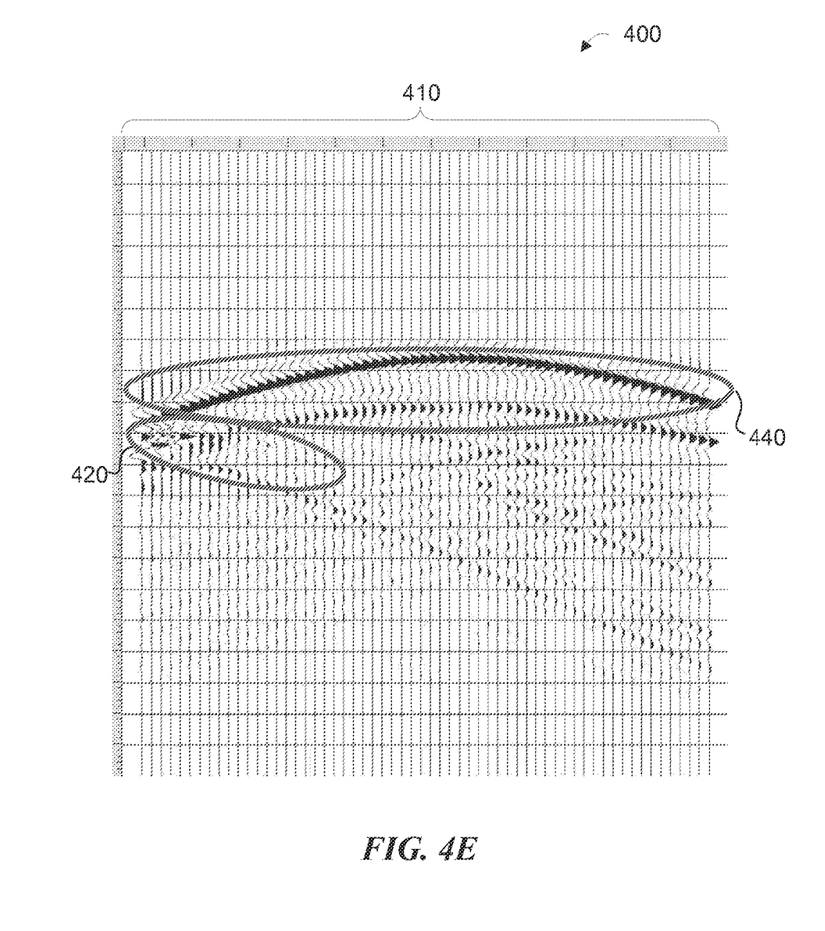

Once outlier waveforms have been determined, the outlier waveforms may then be attenuated or removed from the isolated portion of seismic data 400. The shift in traces 410 of the isolated portion of seismic data 400 containing the attenuated coherent noise event 420 may then be undone (i.e., traces 410 may be shifted back to their original time). Once the shift in traces 410 has been undone, the isolated portion of seismic data 400 containing the attenuated coherent noise event 420 may be merged back into the full set of seismic data 400 for further signal analysis. FIG. 4E illustrates seismic data 400 comprising the merged data from FIG. 4D after attenuation has been performed on coherent noise event 420. When compared with seismic data 400 of FIG. 4A, it will be recognized that coherent noise event 420 has been attenuated without also attenuating desired signals in seismic data 400, such as signals 440 in FIG. 4E.

Modifications, additions, or omissions may be made to FIGS. 4A-4E without departing from the scope of the present disclosure. For example, although illustrated as isolating and shifting only a portion of seismic data 400, the entire set of seismic data 400 may be shifted with coherent noise events being attenuated according to the methods described above. As another example, although illustrated and described as performing statistical outlier analysis at particular times or in particular time windows, each trace may be separately analyzed for statistical outliers (with the outliers being attenuated) prior to performing the steps described above. Furthermore, although illustrated as attenuating coherent noise in seismic data, methods according to the present disclosure may be used to attenuate coherent noise in other types of data, such as digital imaging data.

Figure 5:
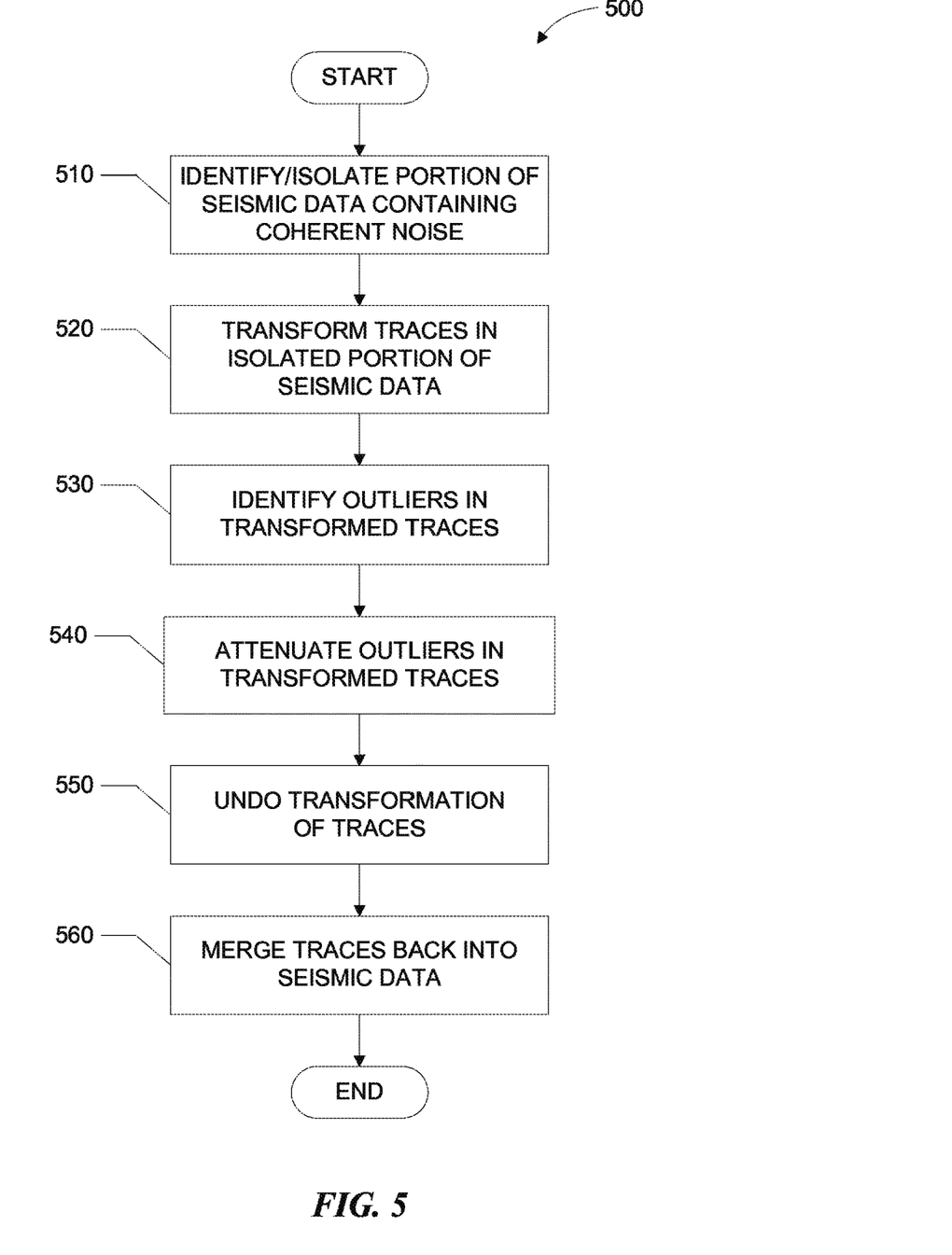
FIG. 5 illustrates an example method for attenuating coherent noise in seismic data using statistical techniques, in accordance with embodiments of the present disclosure.

FIG. 5 illustrates an example method 500 for attenuating coherent noise in seismic data using statistical techniques, in accordance with embodiments of the present disclosure. Method 500 may be performed using one or more computing systems, such as computing system 200 of FIG. 2, located in one or more components of a seismic data collection system, such as seismic data collection system 100 of FIG. 1. For example, method 500 may be performed by a computing system located in logging facilities 140 or logging tool 125 of FIG. 1, or in any combination thereof.

Method 500 may begin at step 510, where a portion of seismic data containing coherent noise is identified and isolated. The coherent noise may be a coherent noise event similar to coherent noise event 320 of FIGS. 3A-3G or coherent noise event 420 of FIGS. 4A-4F, and may be identified according to geophysical knowledge. The portion of seismic data containing the coherent noise may then be isolated using one or more windows of time. This may be done in order to shield desired signals in the seismic data from attenuation according to the methods of the present disclosure, especially desired data that having amplitudes similar to those of the coherent noise. For example, each trace of the portion of seismic data containing the coherent noise may be isolated using the same time window (i.e., a single time window is applied to the entire seismic data set, regardless of the moveout of the coherent noise). As another example, each trace of the portion of seismic data containing the coherent noise may be isolated using a time window that varies based on the moveout of the coherent noise. For example, a window similar to window 430 of FIGS. 4B-4C may be used to isolate the coherent noise from the remainder of the seismic data that contains desired signals.

At step 520, the traces of the isolated portion of seismic data may be transformed. As an example, the traces of the isolated portion of seismic data may be shifted in time. As another example, the data may be transformed using the tau-p transform. In particular embodiments, the traces may be transformed according to one or more rules. For example, the traces in the isolated data may each be shifted by an increasing multiple of a first break time, $t_0$. In certain embodiments, the rules used to shift the traces of isolated seismic data may be determined according to an iterative estimation method. For example, a first shifting rule may be used for shifting the isolated traces, with it then being determined whether the shifted traces may be analyzed using aspects of the present disclosure (i.e., whether the coherent noise has become sufficiently random with respect to time such that the noisy waveforms may be identified and attenuated using the methods of the present disclosure).

At step 530, waveforms having outlying amplitudes during particular windows of time are identified in the transformed traces of isolated seismic data. This may be done using statistical methods, in particular embodiments. In addition, the determinations may be made for multiple windows of time in the transformed traces. For example, thresholds based on the mean and standard deviation may be applied to waveforms in each of a plurality of time windows applied to time shifted traces of isolated seismic data to determine whether the waveforms are statistical outliers. As another example, thresholds based on the mean and standard deviation may be applied to waveforms in each of a plurality of time windows applied to time shifted traces of isolated seismic data to determine whether the waveforms are statistical outliers.

At step 540, the identified outlying waveforms for each time window are attenuated. In particular embodiments, this may include multiplying the identified outlier waveforms by a coefficient that is less than one. In some embodiments, this may include multiplying the identified outlier waveforms by a coefficient that is zero (i.e., removing the identified outlying waveform from the data set). In certain embodiments, this may include removing the identified outlying waveform from the data set and replacing the outlier waveform with a new signal that is interpolated based on adjacent data (such as data in one or more adjacent traces).

At step 550, the transformation applied to the traces of isolated seismic data at step 520 is undone. That is, the transformed traces in the isolated seismic data (now containing attenuated coherent noise) are transformed back to their original reference position. For example, traces shifted by a particular amount of time may be shifted back by the same amount of time. As another example, traces transformed using the tau-p transform may be undone using an inverse tau-p transform. Finally, at step 560, the traces of isolated seismic data containing the attenuated coherent noise are merged back into the full set of seismic data, resulting in a seismic data set with attenuated coherent noise.

Modifications, additions, or omissions may be made to method 500 without departing from the scope of the present disclosure. For example, the order of the steps may be performed in a different manner than that described and some steps may be performed at the same time. Additionally, each individual step may include additional steps without departing from the scope of the present disclosure. Furthermore, although described as attenuating coherent noise in seismic data, method 500 may be used to attenuate coherent noise in other types of data, such as digital imaging data.

To provide illustrations of one or more embodiments of the present disclosure, the following examples are provided.

In one embodiment, a system for attenuating coherent noise from seismic data comprises one or more sensors configured to sense waves generated by a seismic source, and a coherent noise attenuation module comprising a processor and memory, the coherent noise attenuation module communicably coupled to the one or more sensors. The coherent noise attenuation module is operable to receive a plurality of traces of seismic data from the one or more sensors, apply a first transformation to the plurality of traces of seismic data, identify one or more outlier waveforms in the transformed traces, attenuate the identified outlier waveforms, and apply a second transformation to the plurality of transformed traces, the second transformation being an inverse of the first transformation.

In one or more aspects of the disclosed system, the coherent noise attenuation module operable to apply the first transformation is further operable to apply a time shift to each particular trace of the plurality of traces that is different from time shifts applied to each of the other traces of the plurality of traces, and the coherent noise attenuation module operable to applying the second transformation is further operable to apply a time shift to each particular trace of the plurality of transformed traces that is the opposite of the time shift applied to the particular trace in the first transformation.

In one or more aspects of the disclosed system, the coherent noise attenuation module operable to apply the first transformation is further operable to apply a tau-p transformation to the plurality of traces of seismic data, and the coherent noise attenuation module operable to apply the second transformation is further operable to apply an inverse tau-p transform to the plurality of transformed traces.

In one or more aspects of the disclosed system, the coherent noise attenuation module is further operable to isolate a portion of the plurality of traces of seismic data prior to applying the first transformation.

In one or more aspects of the disclosed system, the coherent noise attenuation module is further operable to isolate a portion of the plurality of transformed traces of seismic data after applying the first transformation.

In one or more aspects of the disclosed system, the coherent noise attenuation module is further operable to isolate a portion of the plurality of traces of seismic data using a time window.

In one or more aspects of the disclosed system, the coherent noise attenuation module is further operable to isolate a portion of the plurality of traces of seismic data based on a moveout of a coherent noise event identified in the plurality of traces of seismic data.

In one or more aspects of the disclosed system, the coherent noise attenuation module operable to identify the one or more outlier waveforms is further operable to identify the one or more outlier waveforms using a threshold applied to at least a portion of the plurality of transformed traces.

In one or more aspects of the disclosed system, the threshold is based on mean and standard deviation of amplitudes of waveforms in the at least a portion of the plurality of transformed traces.

In one or more aspects of the disclosed system, the threshold is based on percentiles of amplitudes of waveforms in the at least a portion of the plurality of transformed traces.

In one or more aspects of the disclosed system, the coherent noise attenuation module is further operable to determine the first transformation using an iterative estimation process.

In one or more aspects of the disclosed system, the coherent noise attenuation module operable to attenuate the identified outlier waveforms is further operable to multiply the waveforms by a coefficient that is less than one.

In one or more aspects of the disclosed system, the coherent noise attenuation module operable to attenuate the identified outlier waveforms is further operable to multiply the waveforms by a coefficient that is zero.

In one or more aspects of the disclosed system, the coherent noise attenuation module operable to attenuate the identified outlier waveforms is further operable to replace each of the identified outlier waveforms with an interpolated waveform based on adjacent waveforms to the outlier waveform.

In another embodiment, a method for attenuating coherent noise from seismic data includes receiving a plurality of traces of seismic data from one or more sensors configured to sense waves generated by a seismic source, applying a first transformation to the plurality of traces of seismic data, identifying one or more outlier waveforms in the transformed traces, attenuating the identified outlier waveforms, and applying a second transformation to the plurality of transformed traces, the second transformation being an inverse of the first transformation.

In one or more aspects of the disclosed method, applying the first transformation includes applying a time shift to each particular trace of the plurality of traces that is different from time shifts applied to each of the other traces of the plurality of traces, and applying the second transformation includes applying a time shift to each particular trace of the plurality of transformed traces that is the opposite of the time shift applied to the particular trace in the first transformation.

In one or more aspects of the disclosed method, applying the first transformation includes applying a tau-p transformation to the plurality of traces of seismic data, and applying the second transformation includes applying an inverse tau-p transform to the plurality of transformed traces.

In one or more aspects of the disclosed method, the method further comprises isolating a portion of the plurality of traces of seismic data prior to applying the first transformation.

In one or more aspects of the disclosed method, the method further comprises isolating a portion of the plurality of traces of seismic data after applying the first transformation.

In one or more aspects of the disclosed method, the method further comprises isolating a portion of the plurality of traces of seismic data using a time window.

In one or more aspects of the disclosed method, the method further comprises isolating a portion of the plurality of traces of seismic data based on a moveout of a coherent noise event identified in the plurality of traces of seismic data.

In one or more aspects of the disclosed method, identifying the one or more outlier waveforms further comprises identifying the one or more outlier waveforms using a threshold applied to at least a portion of the plurality of transformed traces.

In one or more aspects of the disclosed method, the threshold is based on mean and standard deviation of amplitudes of waveforms in the at least a portion of the plurality of transformed traces.

In one or more aspects of the disclosed method, the threshold is based on percentiles of amplitudes of waveforms in the at least a portion of the plurality of transformed traces.

In one or more aspects of the disclosed method, the method further comprises determining the first transformation using an iterative estimation process.

In one or more aspects of the disclosed method, attenuating the identified outlier waveforms further comprises multiplying the waveforms by a coefficient that is less than one.

In one or more aspects of the disclosed method, attenuating the identified outlier waveforms further comprises multiplying the waveforms by a coefficient that is zero.

In one or more aspects of the disclosed method, attenuating the identified outlier waveforms further comprises replacing each of the identified outlier waveforms with an interpolated waveform based on adjacent waveforms to the outlier waveform.

In another embodiment, a computer-readable medium comprises instructions that are operable, when executed by a processor, to cause the processor to receive a plurality of traces of seismic data from one or more sensors configured to sense waves generated by a seismic source, apply a first transformation to the plurality of traces of seismic data, identify one or more outlier waveforms in the transformed traces, attenuate the identified outlier waveforms, and apply a second transformation to the plurality of transformed traces, the second transformation being an inverse of the first transformation.

In one or more aspects of the disclosed computer-readable medium, the instructions operable to cause the processor to apply the first transformation are further operable to cause the processor to apply a time shift to each particular trace of the plurality of traces that is different from time shifts applied to each of the other traces of the plurality of traces, and the instructions operable to cause the processor to apply the second transformation are further operable to cause the processor to apply a time shift to each particular trace of the plurality of transformed traces that is the opposite of the time shift applied to the particular trace in the first transformation.

In one or more aspects of the disclosed computer-readable medium, the instructions operable to cause the processor to apply the first transformation are further operable to cause the processor to apply a tau-p transformation to the plurality of traces of seismic data, and the instructions operable to cause the processor to apply the second transformation are further operable to cause the processor to apply an inverse tau-p transform to the plurality of transformed traces.

In one or more aspects of the disclosed computer-readable medium, the instructions are further operable to cause the processor to isolate a portion of the plurality of traces of seismic data prior to applying the first transformation.

In one or more aspects of the disclosed computer-readable medium, the instructions are further operable to cause the processor to isolate a portion of the plurality of traces of seismic data after applying the first transformation.

In one or more aspects of the disclosed computer-readable medium, the instructions are further operable to cause the processor to isolate a portion of the plurality of traces of seismic data using a time window.

In one or more aspects of the disclosed computer-readable medium, the instructions are further operable to cause the processor to isolate a portion of the plurality of traces of seismic data based on a moveout of a coherent noise event identified in the plurality of traces of seismic data.

In one or more aspects of the disclosed computer-readable medium, the instructions operable to cause the processor to identify the one or more outlier waveforms are further operable to cause the processor to identify the one or more outlier waveforms using a threshold applied to at least a portion of the plurality of transformed traces.

In one or more aspects of the disclosed computer-readable medium, the threshold is based on mean and standard deviation of amplitudes of waveforms in the at least a portion of the plurality of transformed traces.

In one or more aspects of the disclosed computer-readable medium, the threshold is based on percentiles of amplitudes of waveforms in the at least a portion of the plurality of transformed traces.

In one or more aspects of the disclosed computer-readable medium, the instructions are further operable to cause the processor to determine the first transformation using an iterative estimation process.

In one or more aspects of the disclosed computer-readable medium, the instructions operable to cause the processor to attenuate the identified outlier waveforms are further operable to cause the processor to multiply the waveforms by a coefficient that is less than one.

In one or more aspects of the disclosed computer-readable medium, the instructions operable to cause the processor to attenuate the identified outlier waveforms are further operable to cause the processor to multiply the waveforms by a coefficient that is zero.

In one or more aspects of the disclosed computer-readable medium, the instructions operable to cause the processor to attenuate the identified outlier waveforms are further operable to cause the processor to replace each of the identified outlier waveforms with an interpolated waveform based on adjacent waveforms to the outlier waveform.

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The terms "couple" or "couples" as used herein are intended to mean either an indirect or a direct connection. Thus, if a first device couples to a second device, that connection may be through a direct connection, or through an indirect electrical or mechanical connection via other devices and connections.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EE-PROM"), and/or flash memory; as well as communications media such as wires.

The present disclosure is therefore well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A system for attenuating coherent noise from seismic data, comprising:
   one or more sensors configured to sense waves generated by a seismic source; and
   a coherent noise attenuation module comprising a processor and memory, the coherent noise attenuation module communicably coupled to the one or more sensors and operable to:
   receive a plurality of traces of seismic data from the one or more sensors;
   apply a first transformation to the plurality of traces of seismic data;
   identify one or more outlier waveforms in the transformed traces;
   attenuate the identified outlier waveforms; and
   apply a second transformation to the plurality of transformed traces,
   the second transformation being an inverse of the first transformation.

2. The system of claim 1, wherein
   the coherent noise attenuation module operable to apply the first transformation is further operable to apply at least one of a time shift to each particular trace of the plurality of traces that is different from time shifts applied to each of the other traces of the plurality of traces and an inverse tau-p transformation to the plurality of traces of seismic data; and
   the coherent noise attenuation module operable to apply the second transformation is further operable to apply at least one of a time shift to each particular trace of the plurality of transformed traces that is the opposite of the time shift applied to the particular trace in the first transformation and an inverse tau-p transform to the plurality of transformed traces.

3. The system of claim 1, wherein the coherent noise attenuation module is further operable to isolate a portion of the plurality of traces of seismic data based on at least one of a time window and a moveout of a coherent noise event identified in the plurality of traces of seismic data.

4. The system of claim 1, wherein the coherent noise attenuation module operable to identify the one or more outlier waveforms is further operable to identify the one or more outlier waveforms using a threshold applied to at least a portion of the plurality of transformed traces.

5. The system of claim 4, wherein the threshold is based on at least one of mean and standard deviation of amplitudes of waveforms in the at least a portion of the plurality of transformed traces and percentiles of amplitudes of waveforms in the at least a portion of the plurality of transformed traces.

6. The system of claim 1, wherein the coherent noise attenuation module is further operable to determine the first transformation using an iterative estimation process.

7. The system of claim 1, wherein the coherent noise attenuation module operable to attenuate the identified outlier waveforms is further operable to at least one of multiply the waveforms by a coefficient that is less than one and replace each of the identified outlier waveforms with an interpolated waveform based on adjacent waveforms to the outlier waveform.

8. A method for attenuating coherent noise from seismic data, comprising:
   receiving a plurality of traces of seismic data from one or more sensors configured to sense waves generated by a seismic source;
   applying a first transformation to the plurality of traces of seismic data;
   identifying one or more outlier waveforms in the transformed traces;
   attenuating the identified outlier waveforms; and
   applying a second transformation to the plurality of transformed traces, the second transformation being an inverse of the first transformation.

9. The method of claim 8, wherein:
   applying the first transformation includes at least one of applying a time shift to each particular trace of the plurality of traces that is different from time shifts applied to each of the other traces of the plurality of traces and a tau-p transformation to the plurality of traces of seismic data; and
   applying the second transformation includes applying at least one of a time shift to each particular trace of the plurality of transformed traces that is the opposite of the time shift applied to the particular trace in the first transformation and an inverse tau-p transform to the plurality of transformed traces.

10. The method of claim 8, further comprising isolating a portion of the plurality of traces of seismic data based on at least one of a time window and a moveout of a coherent noise event identified in the plurality of traces of seismic data.

11. The method of claim 8, wherein identifying the one or more outlier waveforms further comprises identifying the one or more outlier waveforms using a threshold applied to at least a portion of the plurality of transformed traces.

12. The method of claim 11, wherein the threshold is based on at least one of mean and standard deviation of amplitudes of waveforms in the at least a portion of the plurality of transformed traces and percentiles of amplitudes of waveforms in the at least a portion of the plurality of transformed traces.

13. The method of claim 8, further comprising determining the first transformation using an iterative estimation process.

14. The method of claim 8, wherein attenuating the identified outlier waveforms further comprises at least one of multiplying the waveforms by a coefficient that is less than one and replacing each of the identified outlier waveforms with an interpolated waveform based on adjacent waveforms to the outlier waveform.

15. A non-transitory computer-readable medium comprising storing one or more executable instructions that, when executed, by a processor, cause the processor to:
  receive a plurality of traces of seismic data from one or more sensors configured to sense waves generated by a seismic source;
  apply a first transformation to the plurality of traces of seismic data;
  identify one or more outlier waveforms in the transformed traces;
  attenuate the identified outlier waveforms; and
  apply a second transformation to the plurality of transformed traces, the second transformation being an inverse of the first transformation.

16. The non-transitory computer-readable medium of claim 15, wherein:
  applying the first transformation comprises applying at least one of a time shift to each particular trace of the plurality of traces that is different from time shifts applied to each of the other traces of the plurality of traces and a tau-p transformation to the plurality of traces of seismic data;
  applying the second transformation comprises applying at least one of a time shift to each particular trace of the plurality of transformed traces that is the opposite of the time shift applied to the particular trace in the first transformation an inverse tau-p transform to the plurality of transformed traces; and
  identifying the one or more outlier waveforms comprises identifying the one or more outlier waveforms using a threshold applied to at least a portion of the plurality of transformed traces.

17. The non-transitory computer-readable medium of claim 15, wherein the one or more instructions, when executed by the processor, further cause the processor to isolate a portion of the plurality of traces of seismic data based on at least one of a time window and a moveout of a coherent noise event identified in the plurality of traces of seismic data.

18. The non-transitory computer-readable medium of claim 15, wherein the threshold is based on at least one of mean and standard deviation of amplitudes of waveforms in the at least a portion of the plurality of transformed traces and percentiles of amplitudes of waveforms in the at least a portion of the plurality of transformed traces.

19. The non-transitory computer-readable medium of claim 15, wherein the one or more instructions, when executed by the processor, further cause the processor to determine the first transformation using an iterative estimation process.

20. The non-transitory computer-readable medium of claim 15, wherein the one or more instructions, when executed by the processor, further cause the processor to attenuate the identified outlier waveforms are further operable to cause the processor to at least one of multiply the waveforms by a coefficient that is less than one and replace each of the identified outlier waveforms with an interpolated waveform based on adjacent waveforms to the outlier waveform.

* * * * *